US012617318B2

(12) United States Patent
Lin et al.

(10) Patent No.: US 12,617,318 B2
(45) Date of Patent: May 5, 2026

(54) CONTROL METHOD FOR AUTOMOTIVE SEAT

(71) Applicant: NINGBO WELLDON INFANT AND CHILD SAFETY TECHNOLOGY CO., LTD., Ningbo (CN)

(72) Inventors: Jiangjuan Lin, Ningbo (CN); Huanle Xia, Ningbo (CN)

(73) Assignee: NINGBO WELLDON INFANT AND CHILD SAFETY TECHNOLOGY CO., LTD., Ningbo (CN)

( * ) Notice: Subject to any disclaimer, the term of this patent is extended or adjusted under 35 U.S.C. 154(b) by 35 days.

(21) Appl. No.: 18/749,641

(22) Filed: Jun. 21, 2024

(65) Prior Publication Data

US 2024/0424959 A1 Dec. 26, 2024

(30) Foreign Application Priority Data

Jun. 21, 2023 (CN) .......................... 202310744103.8

(51) Int. Cl.
B60N 2/02 (2006.01)
B60N 2/26 (2006.01)

(52) U.S. Cl.
CPC ......... B60N 2/0268 (2023.08); B60N 2/0226 (2023.08); B60N 2/26 (2013.01)

(58) Field of Classification Search
CPC ...... B60N 2/0268; B60N 2/0226; B60N 2/26; B60N 2/2869; B60N 2/0228; B60N 2/0248; B60N 2/30; B60Y 2400/301
See application file for complete search history.

(56) References Cited

U.S. PATENT DOCUMENTS

2019/0106926 A1 4/2019 Seki
2023/0068575 A1* 3/2023 Keegan ................ B60N 2/2875

FOREIGN PATENT DOCUMENTS

| CN | 110712572 A | * | 1/2020 | .......... B60N 2/2821 |
| CN | 114919474 A | | 8/2022 | |
| CN | 115107595 A | | 9/2022 | |
| CN | 116142047 A | | 5/2023 | |

(Continued)

OTHER PUBLICATIONS (CN 110712572A) english trans (Year: 2020).*
(DE 102018211699 A1) English trans (Year: 2018).*

*Primary Examiner* — Abby Lin
*Assistant Examiner* — Renee LaRose
(74) *Attorney, Agent, or Firm* — Bayramoglu Law Offices LLC

(57) ABSTRACT

A control method for an automotive seat is applied to a child safety seat. The method includes: acquiring a distance between an automotive door and the seat after the automotive door is opened; determining that the distance is greater than or equal to a preset threshold; and controlling the seat to rotate to a preset position. The control method acquires the distance between the automotive door and the seat to determine whether the automotive door is open, and compares the acquired distance with the preset threshold to determine whether the automotive door is open to a certain angle. In this way, the control method determines whether a user intends to use the child seat. When the acquired distance between the automotive door and the seat is greater than or equal to the preset threshold, the control method controls the seat to rotate automatically to an execution position.

18 Claims, 6 Drawing Sheets

(56)     References Cited

FOREIGN PATENT DOCUMENTS

| CN | 114919474   B   | 7/2023  | |
|----|----------------|---------|--------------|
| DE | 102018211699  A1 * | 1/2020 | ............ G08B 21/24 |
| JP | S62101546   A  | 5/1987  | |
| JP | S62125929   A  | 6/1987  | |
| JP | 2009107467  A  | 5/2009  | |
| JP | 2018197027  A  | 12/2018 | |

* cited by examiner

Acquire a distance between an automotive door
and a seat after the automotive door is opened Determine that the distance is greater than or
equal to a preset threshold Control the seat to rotate to a preset position Acquire, by sensors at two sides of the seat after the seat is mounted, a left distance and a right distance between the automotive doors and the seat when the automotive doors are closed Compare the left distance and the right distance to determine an in-vehicle mounting position of the seat Manually set the in-vehicle mounting position of the seat

FIG. 4

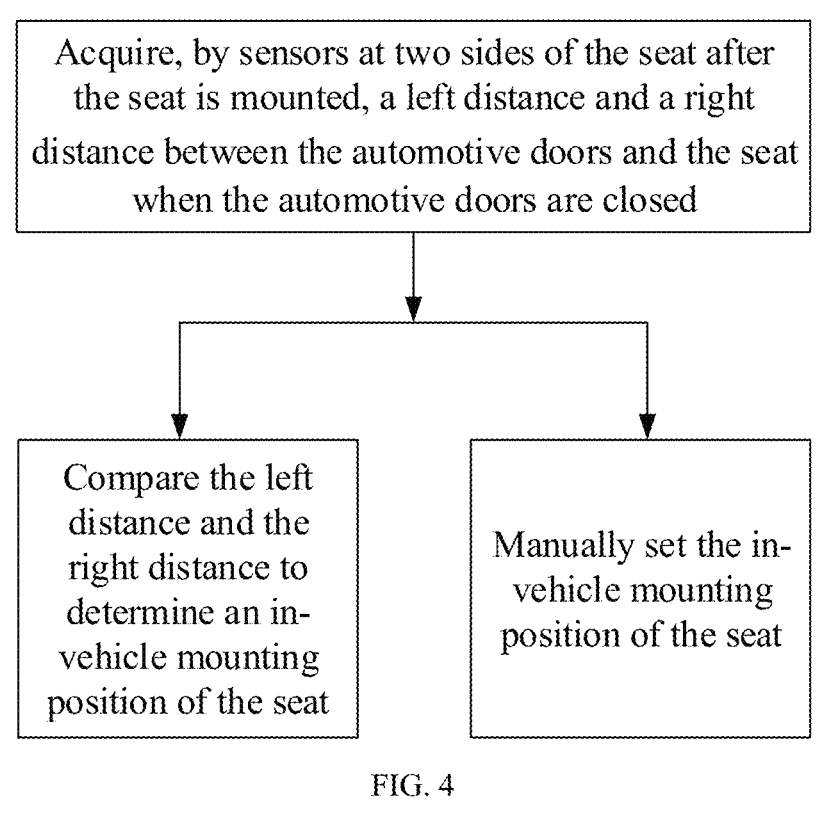

CONTROL METHOD FOR AUTOMOTIVE SEAT

CROSS REFERENCE TO THE RELATED APPLICATIONS

This application is based upon and claims priority to Chinese Patent Application No. 202310744103.8, filed on Jun. 21, 2023, the entire contents of which are incorporated herein by reference.

TECHNICAL FIELD

The present application relates to the technical field of automotive seats, and in particular to a control method for an automotive seat.

BACKGROUND

Child safety seats are designed to facilitate parents in taking care of and protecting children.

At present, in order to further facilitate parents in placing children on child safety seats, there are some rotatable child safety seats emerging on the market. When the parent want to place a child on the seat, the seat can be rotated to a suitable angle to align with the automotive door, making it easy for the parent to place the child directly onto the seat from the automotive door.

However, for the child safety seat with the rotation function on the market, the rotation of the seat requires manual activation of a button. In actual use, the parent may hold the child or carry other objects, making it inconvenient for the parent to activate the button. Therefore, the rotatable child safety seat needs further improvement.

SUMMARY

In response to the above technical issues, the present application provides a control method for an automotive seat. The control method provides an automatic rotation function for a seat, such that when an automotive door is opened, the seat can rotate automatically without the need for manual activation, greatly facilitating the use of a parent.

An embodiment of the present application provides a control method for an automotive seat, applied to a child safety seat, and including:

acquiring a distance between an automotive door and the seat after the automotive door is opened;

determining that the distance is greater than or equal to a preset threshold; and controlling the seat to rotate to a preset position.

Compared with the prior art, in the present application, the control method acquires the distance between the automotive door and the seat to determine whether the automotive door is open, and compares the acquired distance with the preset threshold to determine whether the automotive door is open to a certain angle. The preset threshold indicates the distance between the automotive door and the seat when the automotive door is opened to a certain angle. Through the preset threshold, the control method can determine whether the user has opened the automotive door enough and whether the user intends to place a child on the seat or take the child away from the seat.

When the acquired distance between the automotive door and the seat is greater than or equal to the preset threshold, it indicates that the user intends to use the seat. At this point, the seat can be controlled to rotate automatically to an execution position, making it easy for the user to use the seat.

In the present application, the control method determines whether the seat needs to rotate automatically based on the opening degree of the automotive door, avoiding the error of rotating when the automotive door is slightly opened, and improving the accuracy of automatic rotation of the seat. In addition, the seat can rotate automatically for user convenience, greatly facilitating user experience.

In some optional embodiments, before acquiring the distance between the automotive door and the seat after the automotive door is opened, the method includes:

acquiring, by a sensor, a distance between the automotive door and the seat when the automotive door is closed as an initial distance.

In some optional embodiments, after acquiring the initial distance, the method includes:

determining the preset threshold based on the initial distance.

In some optional embodiments, before controlling the seat to rotate to the preset position when determining that the distance is greater than the preset threshold, the method includes:

waiting for a first preset time.

In some optional embodiments, the method further includes:

acquiring, by sensors on two sides of the seat after the seat is mounted, a left distance and a right distance between the automotive doors and the seat when the automotive doors are closed;

comparing the left distance and the right distance to determine an in-vehicle mounting position of the seat; and alternatively, manually setting the in-vehicle mounting position of the seat.

In some optional embodiments, the seat is connected to a control panel for controlling seat modes;

the method further includes:

choosing an automatic control mode for the seat, such that the seat enters the automatic control mode, and the seat is configured to rotate automatically towards the automotive door and reset automatically;

alternatively, choosing a manual control mode for the seat, such that the seat enters the manual control mode, and the seat is merely configured to rotate manually towards the automotive door and rotate manually to reset; and alternatively, choosing a semi-automatic control mode for the seat, such that the seat enters the semi-automatic control mode, and the seat is configured to rotate automatically towards the automotive door and rotate manually to reset.

In some optional embodiments, the seat includes a reset button;

after controlling the seat to rotate to the preset position, the method includes:

pressing the reset button, such that the seat rotates to reset;

alternatively, manually rotating the seat to reset;

alternatively, rotating the seat to reset through voice control; and alternatively, rotating the seat to reset through the control panel.

In some optional embodiments, after controlling the seat to rotate to the preset position, the method includes:

waiting for a second preset time;

acquiring a distance between the automotive door and the seat;

automatically rotating the seat to reset when determining that a difference between the distance and the initial distance is equal to a threshold limit value; and alternatively, remaining the seat in a current state when determining that the difference between the distance and the initial distance is less than or greater than the threshold limit value.

In some optional embodiments, after rotating the seat to reset, the method includes:

acquiring, by the sensor, a distance between the automotive door and the seat;

comparing the distance with the initial distance to determine whether the automotive door is closed;

remaining the seat in a current state when the automotive door is not closed, such that the seat does not rotate towards the automotive door when the automotive door is opened.

In some optional embodiments, the sensor is located on a base of the seat and does not rotate with the seat.

In the present application, the control method for an automotive seat has most if not all of the following technical effects.

The control method acquires the distance between the automotive door and the seat, compares the distance with the preset threshold to determine whether the automotive door is open and determines the opening degree of the automotive door, thereby determining whether the user has a need to use the seat. The seat can rotate automatically for user convenience.

The user can control the seat to rotate and reset through the reset button or manual control, and thus the user can control the seat to rotate and reset according to the actual situation.

The user can choose three modes, namely the automatic mode, the manual mode, and the semi-automatic mode to meet different usage needs. Therefore, the seat is flexible, intelligent, and has a wide range of applicability.

BRIEF DESCRIPTION OF THE DRAWINGS

FIG. 4 is a flowchart of a control method for an automotive seat according to Embodiment 4 of the present application;

DETAILED DESCRIPTION OF THE EMBODIMENTS

In order for those skilled in the art to better understand the technical solution of the present disclosure, the present disclosure is described in detail clearly and completely below in combination with the drawings and embodiments. It should be understood that the specific embodiments described herein are merely intended to explain the present disclosure, rather than to limit the present disclosure.

In the description of the present application, the terms such as "first" and "second" are merely intended to distinguish technical features, rather than to indicate or imply relative importance or implicitly indicate a number of the indicated technical features or implicitly indicate a sequence relationship of the indicated technical features.

It is understandable for those skilled in the art that in the disclosure of the present application, terms such as "longitudinal", "transverse" "upper", "lower", "front", "rear", "left", "right" "vertical", "horizontal", "top", "bottom", "inside" and "outside" indicate the orientation or position relationships based on the drawings. They are merely intended to facilitate and simplify the description of the present application, rather than to indicate or imply that the mentioned device or components must have a specific orientation or must be constructed and operated in a specific orientation. Therefore, these terms should not be construed as a limitation to the present application.

The present application is described in detail below according to FIGS. 1 to 6.

The present application relates to a control method for an automotive seat, applied to a child safety seat, which has a rotating function. A bottom of the seat is provided with a base, and the base is provided with a rotating mechanism. A driving mechanism is configured to drive the rotation of the seat. For the principle of seat rotation, please refer to Chinese Patent Application CN202210140659.1.

Sensors are arranged on left and right sides of the seat. The sensors are ranging sensors for measuring a distance between the seat and an automotive door. The sensors can be laser ranging sensors, infrared ranging sensors, ultrasonic ranging sensors, etc. The type of the ranging sensors is determined based on actual use and is not limited herein as long as the ranging sensors meet the ranging function. In the present application, the sensors measure the distance between the automotive door and the seat in real time after startup and transmit the measured distance to a background processing unit, which control the seat's automatic rotation based on the distance data.

Below are some embodiments of the control method, which enable the seat to have an automatic rotation function. When a user needs to use the child seat, the seat can rotate automatically to a preset position, making it convenient for the user to use the seat.

Embodiment 1

Figure 1:
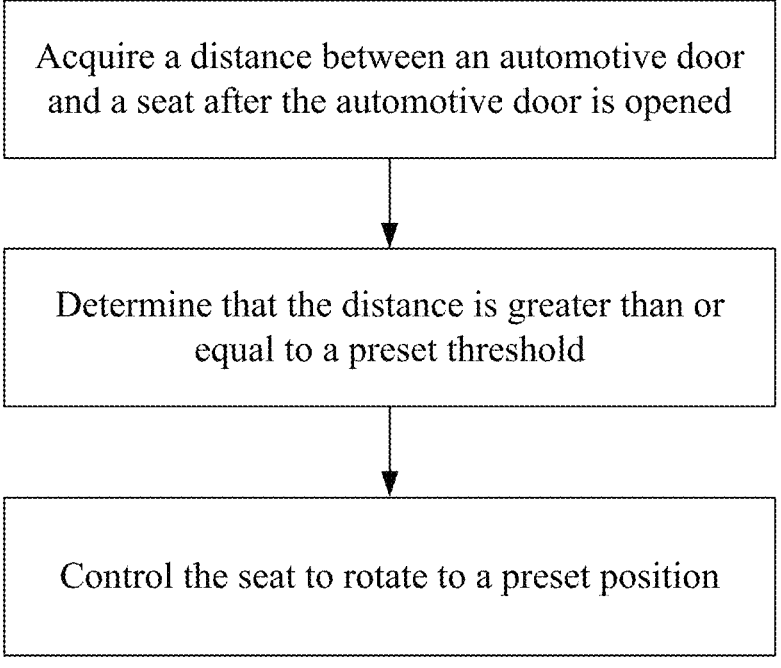
FIG. 1 is a flowchart of a control method for an automotive seat according to Embodiment 1 of the present application.

FIG. 1 is a flowchart of a control method for an automotive seat according to an embodiment of the present application. The method is applied to a child safety seat, and includes the following steps.

Distance X between an automotive door and the seat is acquired after the automotive door is opened.

It is determined that the distance is greater to preset threshold X1.

The seat is controlled to rotate to a preset position.

The preset threshold indicates the distance between the automotive door and the seat when the automotive door is opened to a certain angle. Through the preset threshold, the control method can determine whether the user has opened the automotive door enough and whether the user intends to place a child on the seat or take the child away from the seat.

It should be noted that regardless of whether the automotive door is open or not, the sensor continuously detects the distance X between the automotive door and the seat in real time. When the automotive door is opened, X changes and is not a constant value. When $X \geq X1$, it indicates that the automotive door has opened to a large extent and is not mistakenly opened. This indicates that the user has a need to use the seat, so the seat automatically rotates to a preset position. The seat is rotated from facing an interior of a vehicle towards the automotive door, which greatly facilitates parent to place the child on the seat or take the child away from the seat. The preset position includes direction and angle of rotation, which are set according to the actual situation.

Embodiment 2

This embodiment is extended on the basis of Embodiment 1.

In this embodiment, a control method for an automotive seat includes the following steps.

A distance between the automotive door and the seat when the automotive door is closed is acquired by a sensor as initial distance X0.

The preset threshold is determined based on the initial distance X1.

Distance X between an automotive door and the seat is acquired after the automotive door is opened.

It is determined that the distance is greater than or equal to a preset threshold X1.

The seat is controlled to rotate to a preset position.

Figure 2:
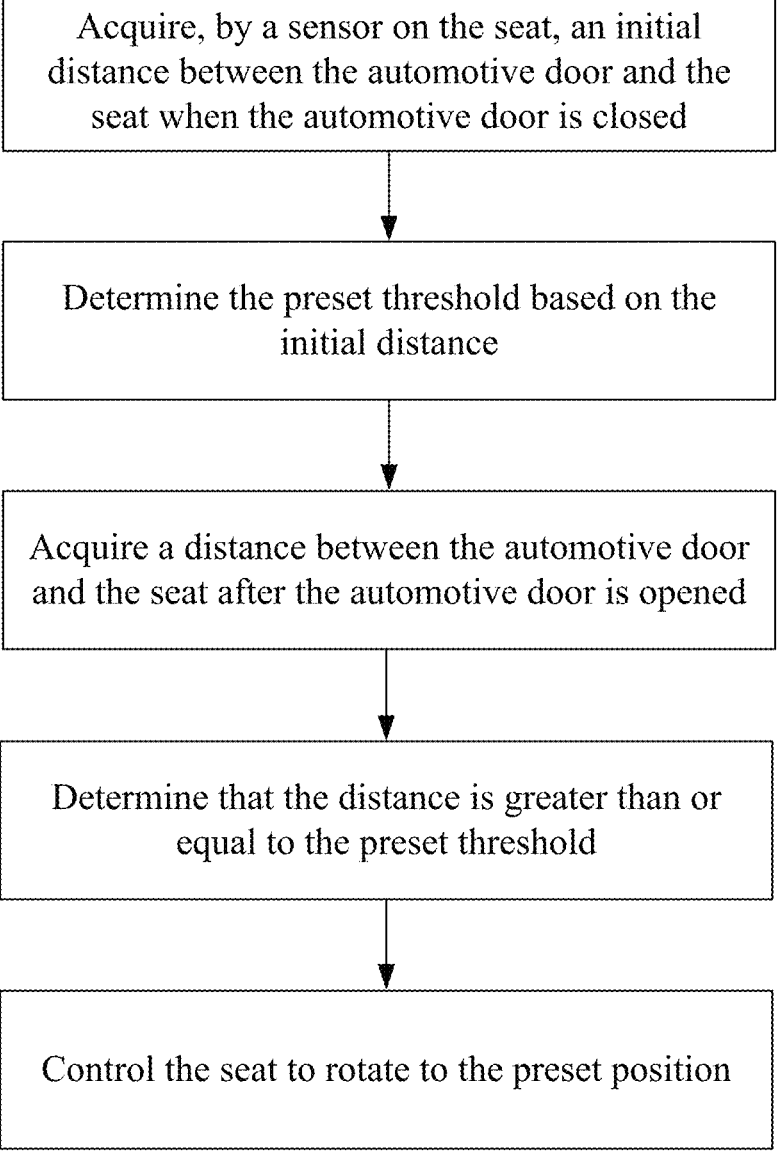
FIG. 2 is a flowchart of a control method for an automotive seat according to Embodiment 2 of the present application.

As shown in FIG. 2, in this embodiment, when the automotive door is closed, the distance between the automotive door and the seat is initial distance X0, and the initial distance is a fixed value. Whether the automotive door is open is determined based on the initial distance. When $X > X0$, it indicates that the automotive door is open, and the next step can be performed.

Due to the different in-vehicle mounting positions of the seat, the initial distance X0 is different, so it is necessary to measure the initial distance. Due to the different automotive models and different door opening habits of parents, it is necessary to determine the preset threshold X1 based on the initial distance X0, $X1 > X$. The technical solution of this embodiment improves the applicability and flexibility of the seat, and can adjust the seat according to different actual situations to suit different the user. Therefore, the seat is intelligent and convenient.

It should be noted that $X1 - X > 5$ cm, which makes the automatic rotation function of the seat more accurate, avoiding the seat from rotating immediately after the automotive door is mistakenly opened.

Embodiment 3

This embodiment can be extended on the basis of Embodiment 1.

In this embodiment, the control method for an automotive seat further includes the following steps.

Distance X between an automotive door and the seat is acquired after the automotive door is opened.

It is determined that the distance is greater than or equal to a preset threshold X1.

The seat waits for first preset time T1.

The seat is controlled to rotate to a preset position.

Figure 3:
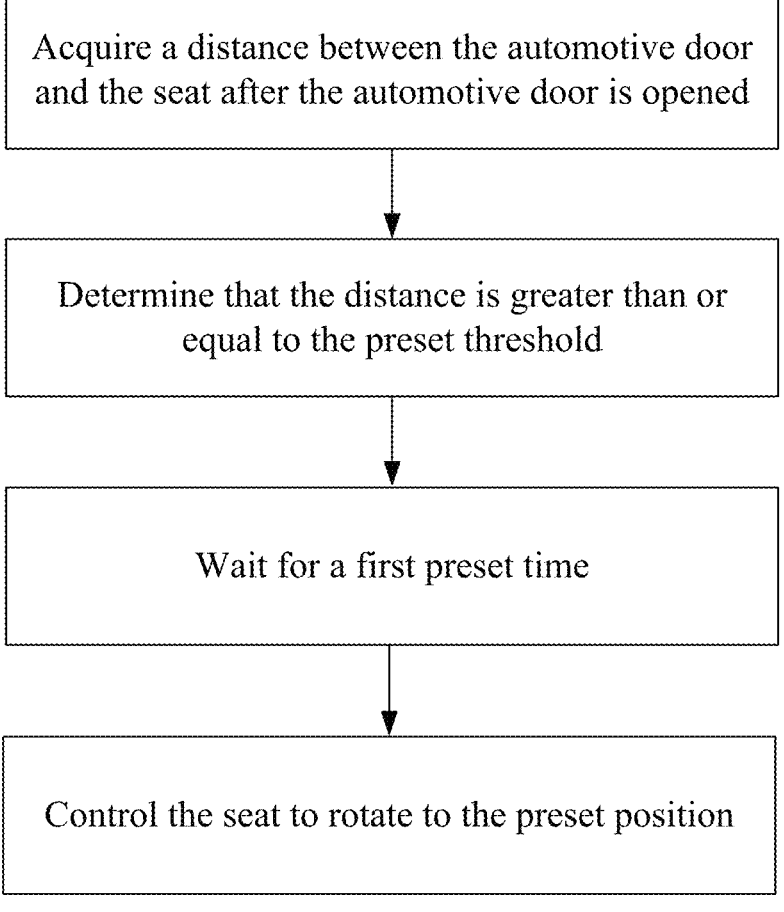
FIG. 3 is a flowchart of a control method for an automotive seat according to Embodiment 3 of the present application.

As shown in FIG. 3, in this embodiment, when $X \geq X1$, the seat automatically rotates to the preset position after waiting for first preset time T1. In this way, after the automotive door is opened, the parent has enough operating time before the seat rotates towards the automotive door, so the parent can check the condition of the seat, pick up the child, or be prepared to pick up the child after opening the automotive door. The design is convenient for the user to operate, reducing safety hazards caused by the seat automatically rotating immediately after the automotive door reaches the designated position, and improving the safety of use.

In this embodiment, the first preset time T1 is 1-5 s. Specifically, the first preset time T1 can be selected based on actual needs or freely set through the control panel. In this implementation, preferably, T1 is 2 s.

It should be noted that this embodiment can further be extended on the basis of Embodiment 2.

Embodiment 4

This embodiment is extended on the basis of Embodiment 1.

In this embodiment, the control method for an automotive seat further includes the following steps.

A left distance and a right distance between the automotive doors and the seat when the automotive doors are closed are acquired by sensors on two sides of the seat after the seat is mounted.

The left distance and the right distance are compared to determine an in-vehicle mounting position of the seat.

Alternatively,

The in-vehicle mounting position of the seat is manually set.

As shown in FIG. 4, in this embodiment, sensors for measuring the distance between the automotive door and the seat are arranged on two sides of the seat. After the seat is mounted, when the automotive door is closed, the sensors on the two sides of the seat acquire the distances from the seat to the automotive doors at the two sides. Based on the left distance and the right distance, the system automatically determines the in-vehicle mounting position of the seat. The seat rotates according to a program set by the system, including the rotation direction and angle of the seat.

Alternatively, the in-vehicle mounting position of the seat is manually set. That is, after the seat is mounted, the user confirms the mounting position of the seat on the control panel that is connected to and controls the seat. For example, the user can choose to set the seat on the left or right side of the vehicle. After the user selects the mounting position, the seat can execute a subsequent program according to the mounting position selected by the user. For example, the user can choose the rotation direction of the seat, which is to turn left or right, and the rotation angle can be set, usually 90 degrees. Of course, the user can flexibly set the rotation angle based on the mounting position and the condition inside the vehicle.

The technical solution of this embodiment improves the applicability and flexibility of the seat, and can adjust the seat according to different actual situations to suit different the user. Therefore, the seat is intelligent and convenient.

It should be noted that this embodiment can further be extended on the basis of Embodiment 2 or 3.

Embodiment 5

This embodiment is extended on the basis of any one of Embodiments 1 to 4.

In this embodiment, the seat is connected to a control panel for controlling the seat mode. The control panel can be a mobile application (APP) interaction page or a computer interaction page, or it can be a control panel directly provided on the seat. The user can control the seat through the control panel to, for example, select the seat mode. The seat corresponds to different modes and execution programs. The user can choose different seat modes to meet different usage needs.

The method further includes the following steps.

An automatic control mode is chosen for the seat, such that the seat enters the automatic control mode, and the seat is configured to rotate automatically towards the automotive door and reset automatically.

Alternatively,

A manual control mode is chosen for the seat, such that the seat enters the manual control mode, and the seat is merely configured to rotate manually towards the automotive door and rotate manually to reset.

Alternatively,

A semi-automatic control mode is chosen for the seat, such that the seat enters the semi-automatic control mode, and the seat is configured to rotate automatically towards the automotive door and rotate manually to reset.

In this embodiment, in the automatic mode, the seat operates completely on its own according to the program. The seat performs automatic detection, automatic determination of whether to rotate, automatic rotation towards the automotive door or automatic rotation to reset. The seat is intelligent and convenient.

In the manual mode, the seat no longer executes the automatic mode program, that is, the seat's automatic detection and automatic rotation functions stop. The user needs to rotate the seat manually, which improves safety. For a user with a child who requires special care, the user can fully manually control the seat to improve the safety of the seat, which makes the user reassured.

In the semi-automatic mode, when the automotive door is opened and the seat rotates towards the automotive door, the seat automatically detects the distance between the automotive door and the seat, and determines whether automatic rotation is required. If necessary, the seat automatically rotates towards the automotive door. However, to reset the seat, the user needs to manually control the seat to rotate so as to reset. This mode has certain safety performance and intelligence, and is relatively flexible.

It should be noted that in this embodiment, the mode is selected before the seat rotates.

Embodiment 6

This embodiment is extended on the basis of Embodiment 5.

In this embodiment, the seat is provided with a reset button. The reset button can be provided on a side of the seat. When a child sits in the seat, the reset button will not be easily touched or blocked by the child, making it easy for the user to touch or press.

After controlling the seat to rotate to the preset position, the method includes the following steps.

The reset button is pressed, such that the seat rotates to reset.

Alternatively,

The seat is manually rotated to reset.

Alternatively,

The seat is rotated to reset through voice control.

Alternatively,

The seat is rotated to reset through the control panel.

Figure 5:
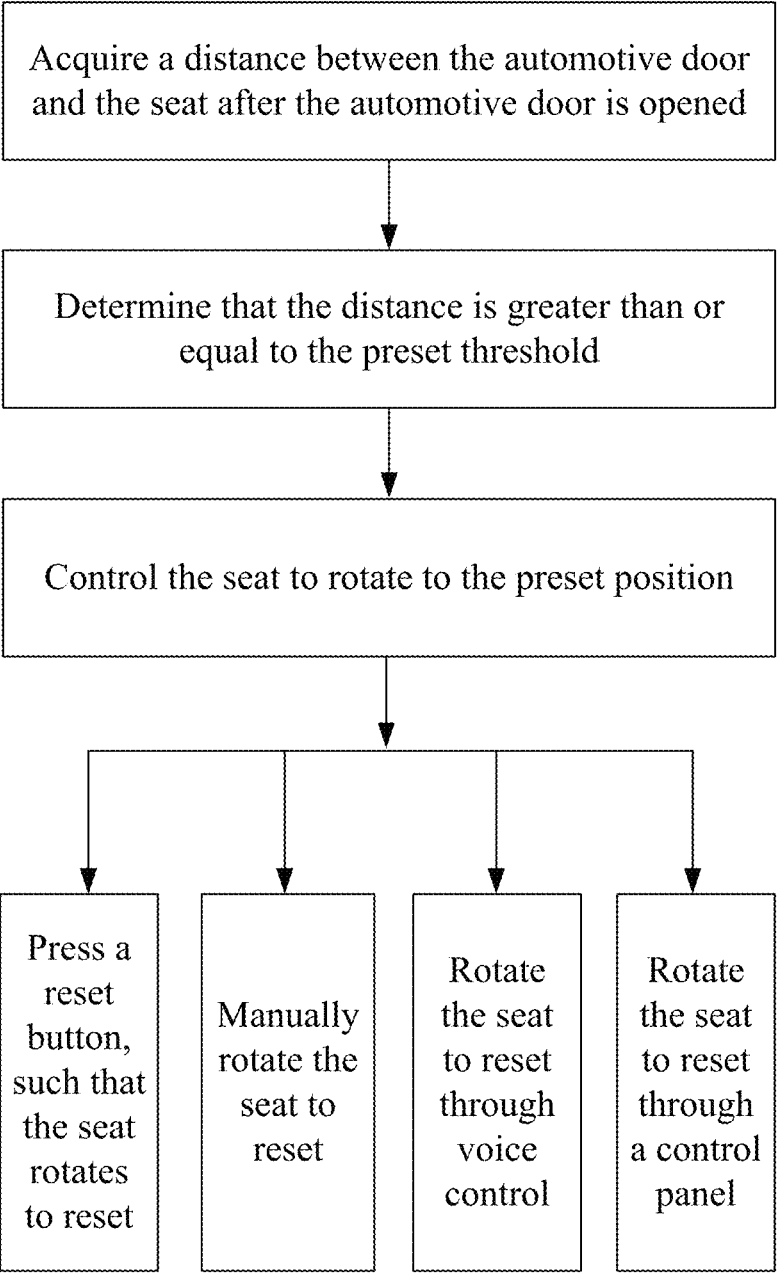
FIG. 5 is a flowchart of a control method for an automotive seat according to Embodiment 6 of the present application.

As shown in FIG. 5, in this embodiment, when the seat is rotated towards the automotive door, the automotive door is open. After the user places the child on the seat or takes the child away from the seat, the user presses the reset button, and the seat rotates and resets on its own, that is, the seat rotates towards the interior of the vehicle. Alternatively, the user can manually rotate the seat towards the interior of the vehicle. Alternatively, the user can rotate the seat to reset through voice control. Of course, the seat is further connected to a speech recognition detector. The detector detects and passes the user's output command to a control background, which outputs a rotation reset command to the seat. Speech recognition technology is widely present in prior art and will not be elaborated herein. In addition, the user can also rotate and reset the seat through the control panel. Through the control panel, the user can remotely control the seat without the need for manual rotation, saving time, effort, and providing convenience. In this implementation, the user has enough time to take care of the child before choosing when to rotate and reset the seat. The design enhances user monitoring and control of seat rotation and reset, greatly reducing safety hazards for the child on the seat, allowing the user to use the seat with peace of mind.

Embodiment 7

This embodiment is further extended on the basis of Embodiment 5.

In this embodiment, after controlling the seat to rotate to the preset position, the method includes the following steps.

The seat waits for second preset time T2.

Distance S between the automotive door and the seat is acquired.

The seat automatically rotates and resets when it is determined that the difference $\Delta X$ between the distance X and the initial distance X0 is equal to the threshold limit value X2.

Alternatively,

The seat remains a current state when it is determined that the difference $\Delta X$ between the distance X and the initial distance X0 is less than or greater than the threshold limit value X2.

Figure 6:
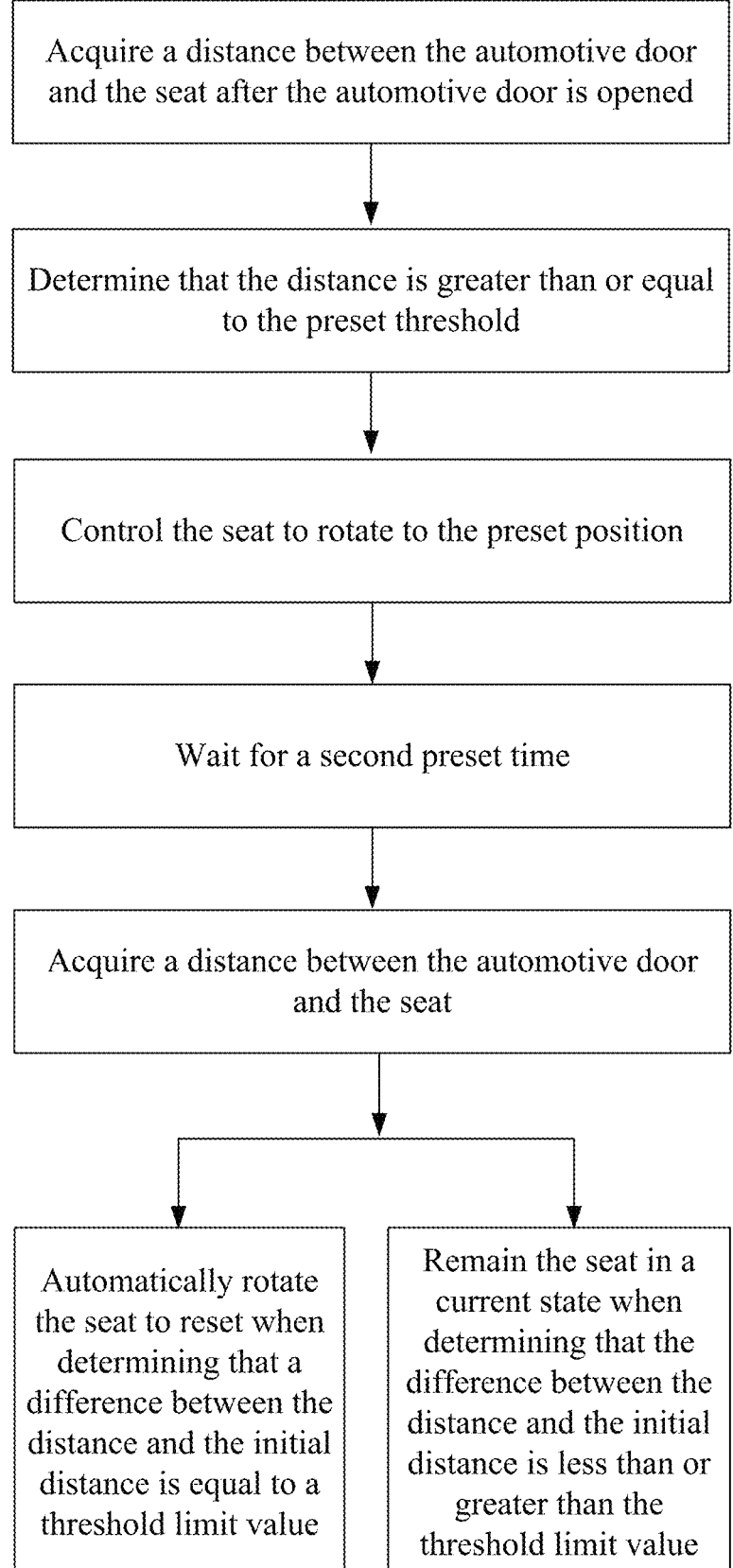
FIG. 6 is a flowchart of a control method for an automotive seat according to Embodiment 7 of the present application.

As shown in FIG. 6, in this embodiment, when the seat is rotated towards the automotive door, the user uses the seat. The second preset time T2 is set to ensure that the user has sufficient time to use the seat. During this period, the user can place the child on the seat or take the child away from the seat. Within the second preset time T2, the data measured by the sensor is not the real distance between the automotive door and the seat, so in order to eliminate this effect, after the seat rotates towards the automotive door, the seat waits for the second preset time T2 before executing the seat rotation and reset program.

The process of rotating and resetting the seat is as follows. After the seat waits for T2, the distance X is compared with X0 to acquire difference $\Delta X$ between X and X0. If the difference $\Delta X$ is within preset threshold limit value X2, i.e. $\Delta X = X\mathbf{2}$, it indicates that the seat meets the automatic rotation reset condition. At this point, the seat automatically rotates and resets. If the difference $\Delta X$ is greater than or less than the threshold limit value X2, i.e. $\Delta X < X\mathbf{2}$ or $\Delta X > X\mathbf{2}$, the seat remains its current state. That is, after the seat continues to wait for T2, the above operation is repeated. In this embodiment, through the threshold limit value, when the user closes the automotive door and the sensor detects the distance between the seat and the automotive door, slight errors may occur due to slight shaking or debris. If the measured distance falls within the threshold limit value based on the initial distance, it can be determined that the automotive door is closed and the seat can rotate and reset. The threshold limit value improves the accuracy of seat rotation and reduces the impact of errors on seat rotation and reset.

It should be noted that in this embodiment, when the seat is rotated towards the automotive door, an edge of the seat will not exceed a body of the vehicle. That is to say, whether the seat rotates or not will not affect the closing and opening of the automotive door.

In this embodiment, T2 ranges from 5 S to 60 S. The specific values of T2 can be set according to actual usage, and can be freely set through the control panel.

Preferably, T2 is 10 s.

Further, after acquiring the initial distance, the method includes the following steps.

The threshold limit value is determined based on the initial distance.

In this embodiment, the threshold limit value X2 represents a continuous range of values, i.e. $X2=[-a, +a]$ mm, $X-X0=\Delta X$. When $\Delta X<-a$ mm or $\Delta X>-a$ mm, the seat remains its current state and continues to wait for T2. The threshold limit value is $X2=[-a, +a]$ mm. The distance within this range can be considered as a normal measurement error, that is, the distance within this range indicates that the automotive door is closed. The design effectively reduces the impact of noise, avoids unnecessary effects on the seat rotation function caused by slight shaking of the automotive door or debris, and improves the accuracy of seat rotation.

Further, if $1$ mm$\leq a\leq 10$ mm, the maximum range of X2 is $[-10,+10]$ mm, and the minimum range thereof is $[-1,+1]$ mm. That is to say, when the sensor detects that the distance between the automotive door and the seat is 1 mm to 10 mm less than or more than the initial distance, it indicates that the automotive door is closed. Of course, the specific value of a can be selected based on the actual vehicle situation.

Preferably, a is 10, that is, $X2=[-10,+10]$ mm.

Embodiment 8

This embodiment is further extended on the basis of Embodiment 6.

In this embodiment, after rotating the seat to reset, the method includes the following steps.

A distance between the automotive door and the seat is acquired by the sensor.

The distance is compared with the initial distance to determine whether the automotive door is closed.

The seat remains in a current state when the automotive door is not closed, such that the seat does not rotate towards the automotive door when the automotive door is opened.

In this embodiment, after the seat rotates to reset, the distance between the automotive door and the seat is detected and compared with the initial distance. If it is larger or smaller than the initial distance, it is determined that the automotive door is not closed. At this point, the seat remains its current state and does not execute the next command, that is, does not execute the command to check whether the automotive door is open and determine whether the seat is rotating. In this way, when the user manually controls the seat to rotate and reset, the user may be at a position between the seat and the automotive door, and may not immediately close the automotive door after the seat rotates to reset. After the seat rotates and resets, the user will leave the position between the automotive door and the seat. At this point, if the distance between the automotive door and the seat is detected, the determination procedure for seat rotation towards the automotive door will be executed again. After the user leaves, the distance between the automotive door and the seat is relatively large, which will cause errors and reduce the accuracy of seat rotation.

Further, referring to the setting of the threshold limit value in Embodiment 7, in this embodiment, the specific determination of whether the automotive door is closed is as follows.

When it is determined that the difference $\Delta X$ between the distance X and the initial distance X0 is equal to the threshold limit value X2, it is determined that the automotive door is closed.

When it is determined that the difference $\Delta X$ between the distance X and the initial distance X0 is less than or greater than the threshold limit value X2, it is determined that the automotive door is open.

By introducing the threshold limit value X2, error elimination is carried out in the step of determining whether the automotive door is closed, in order to reduce the impact of errors and improve the accuracy of seat rotation control.

Further, specifically, comparing the distance with the initial distance to determine whether the automotive door is closed is as follows.

When it is determined that the distance X remains unchanged within the time T3, the automotive door is closed.

The distance X between the automotive door and the seat is continuously detected within the time T3. If the continuously acquired distance X remains unchanged within the time T3, it indicates that the likelihood of the user being at a position between the automotive door and the seat is low. Therefore, it is determined that the automotive door is closed, thereby reducing the impact of errors.

Further, T3 is 1-9 s.

Preferably, T3=5 s.

Embodiment 9

This embodiment is extended on the basis of any one of Embodiments 1 to 5.

In this embodiment, the sensors are provided on the base of the seat and do not rotate with the seat. There are two sensors arranged on opposite sides of the seat facing automotive doors. The sensors are provided on side walls of the base of the seat. The base is provided with a mechanism to drive the rotation of the seat. When the seat rotates, the base does not rotate, so the sensors remain stationary. Therefore, the initial distance between the automotive door and the seat measured by the sensors remains unchanged before and after the seat rotates. The design simplifies the subsequent seat control program, saves costs, and is easy to control, thereby improving control accuracy.

The present application is described in detail above. Specific cases are used herein to illustrate the principle and implementation of the present application, and the description of the above embodiments is only intended to help understand the core idea of the present application. It should be noted that several improvements and modifications may also be made by those of ordinary skill in the art without departing from the principles of the present disclosure, which also fall within the claimed scope of protection of the present disclosure.

The invention claimed is:

1. A control method for an automotive seat, applied to a child safety seat disposed in a vehicle, and comprising:

acquiring a distance between an open automotive door of the vehicle and the child safety seat disposed in the vehicle;

determining that the distance is greater than or equal to a preset threshold; and controlling the child safety seat to rotate to a preset position in response to determining that the distance is greater than or equal to the preset threshold.

2. The control method for the automotive seat according to claim 1, wherein before acquiring the distance between the automotive door and the child safety seat after the automotive door is opened, the control method comprises:

acquiring, by a sensor, an initial distance between the automotive door and the child safety seat when the automotive door is closed.

3. The control method for the automotive seat according to claim 2, wherein after acquiring the initial distance, the control method comprises:

determining the preset threshold based on the initial distance.

4. The control method for the automotive seat according to claim 1, wherein before controlling the child safety seat to rotate to the preset position when determining that the distance is greater than the preset threshold, the control method comprises:

waiting for a first preset time.

5. The control method for the automotive seat according to claim 1, further comprising:

acquiring, by sensors on two sides of the child safety seat after the child safety seat is mounted, a left distance and a right distance between automotive doors and the child safety seat when the automotive doors are closed; and comparing the left distance and the right distance to determine an in-vehicle mounting position of the child safety seat; or manually setting the in-vehicle mounting position of the child safety seat.

6. The control method for the automotive seat according to claim 1, wherein the child safety seat is connected to a control panel for controlling seat modes; and the control method further comprises:

choosing an automatic control mode for the child safety seat, wherein the child safety seat enters the automatic control mode, and the child safety seat is configured to rotate automatically towards the automotive door and reset automatically; or choosing a manual control mode for the child safety seat, wherein the child safety seat enters the manual control mode, and the child safety seat is merely configured to rotate manually towards the automotive door and rotate manually to reset; or choosing a semi-automatic control mode for the child safety seat, wherein the child safety seat enters the semi-automatic control mode, and the child safety seat is configured to rotate automatically towards the automotive door and rotate manually to reset.

7. The control method for the automotive seat according to claim 6, wherein the child safety seat comprises a reset button; and after controlling the child safety seat to rotate to the preset position, the control method comprises:

pressing the reset button, wherein the child safety seat rotates to reset; or manually rotating the child safety seat to reset; or rotating the child safety seat to reset through voice control; or

rotating the child safety seat to reset through the control panel.

8. The control method for the automotive seat according to claim 6, wherein after controlling the child safety seat to rotate to the preset position, the control method comprises:

waiting for a second preset time;

acquiring a distance between the automotive door and the child safety seat; and automatically rotating the child safety seat to reset when determining that a difference between the distance and the initial distance is equal to a threshold limit value, or remaining the child safety seat in a current state when determining that the difference between the distance and the initial distance is less than or greater than the threshold limit value.

9. The control method for the automotive seat according to claim 6, wherein after rotating the child safety seat to reset, the control method further comprises:

acquiring, by the sensor, a distance between the automotive door and the child safety seat;

comparing the distance with the initial distance to determine whether the automotive door is closed;

remaining the child safety seat in a current state when the automotive door is not closed, wherein the child safety seat does not rotate towards the automotive door when the automotive door is opened.

10. The control method for the automotive seat according to claim 1, wherein the sensor is located on a base of the child safety seat and does not rotate with the child safety seat.

11. The control method for the automotive seat according to claim 2, wherein the child safety seat is connected to a control panel for controlling seat modes; and the control method further comprises:

choosing an automatic control mode for the child safety seat, wherein the child safety seat enters the automatic control mode, and the child safety seat is configured to rotate automatically towards the automotive door and reset automatically; or choosing a manual control mode for the child safety seat, wherein the child safety seat enters the manual control mode, and the child safety seat is merely configured to rotate manually towards the automotive door and rotate manually to reset; or choosing a semi-automatic control mode for the child safety seat, wherein the child safety seat enters the semi-automatic control mode, and the child safety seat is configured to rotate automatically towards the automotive door and rotate manually to reset.

12. The control method for the automotive seat according to claim 3, wherein the child safety seat is connected to a control panel for controlling seat modes; and the control method further comprises:

choosing an automatic control mode for the child safety seat, wherein the child safety seat enters the automatic control mode, and the child safety seat is configured to rotate automatically towards the automotive door and reset automatically; or choosing a manual control mode for the child safety seat, wherein the child safety seat enters the manual control mode, and the child safety seat is merely configured to rotate manually towards the automotive door and rotate manually to reset; or choosing a semi-automatic control mode for the child safety seat, wherein the child safety seat enters the semi-automatic control mode, and the child safety seat is configured to rotate automatically towards the automotive door and rotate manually to reset.

13. The control method for the automotive seat according to claim 4, wherein the child safety seat is connected to a control panel for controlling seat modes; and the control method further comprises:

choosing an automatic control mode for the child safety seat, wherein the child safety seat enters the automatic control mode, and the child safety seat is configured to rotate automatically towards the automotive door and reset automatically; or choosing a manual control mode for the child safety seat, wherein the child safety seat enters the manual control mode, and the child safety seat is merely configured to rotate manually towards the automotive door and rotate manually to reset; or choosing a semi-automatic control mode for the child safety seat, wherein the child safety seat enters the semi-automatic control mode, and the child safety seat is configured to rotate automatically towards the automotive door and rotate manually to reset.

14. The control method for the automotive seat according to claim 5, wherein the child safety seat is connected to a control panel for controlling seat modes; and the control method further comprises:

choosing an automatic control mode for the child safety seat, wherein the child safety seat enters the automatic control mode, and the child safety seat is configured to rotate automatically towards the automotive door and reset automatically; or choosing a manual control mode for the child safety seat, wherein the child safety seat enters the manual control mode, and the child safety seat is merely configured to rotate manually towards the automotive door and rotate manually to reset; or choosing a semi-automatic control mode for the child safety seat, wherein the child safety seat enters the semi-automatic control mode, and the child safety seat is configured to rotate automatically towards the automotive door and rotate manually to reset.

15. The control method for the automotive seat according to claim 2, wherein the sensor is located on a base of the child safety seat and does not rotate with the child safety seat.

16. The control method for the automotive seat according to claim 3, wherein the sensor is located on a base of the child safety seat and does not rotate with the child safety seat.

17. The control method for the automotive seat according to claim 4, wherein the sensor is located on a base of the child safety seat and does not rotate with the child safety seat.

18. The control method for the automotive seat according to claim 5, wherein the sensor is located on a base of the child safety seat and does not rotate with the child safety seat.

* * * * *